United States Patent Office.

LOUIS LA BRECHE-VIGER, OF MONTREAL, CANADA, ASSIGNOR TO WILLIAM WOODS AVERELL, OF BATH, NEW YORK.

Letters Patent No. 95,358, dated September 28, 1869.

IMPROVEMENT IN THE MANUFACTURE OF CAST-STEEL.

The Schedule referred to in these Letters Patent and making part of the same.

*To all whom it may concern:*

Be it known that I, LOUIS LA BRECHE-VIGER, of Montreal, in the Province of Quebec, Dominion of Canada, have invented a new Mode of Making and Manufacturing Cast-Steel at one operation, by the use and admixture, first, of plumbago with pulverized iron-ores, and also with what is called iron-sand ore, with wrought-iron, iron scraps, iron shavings, iron chips, and with what is usually styled iron or steel-sponge, either in clay or other non-fusible pots or crucibles, or in a reverberatory furnace; second, of powdered charcoal, anthracite, coke, or other equivalent carbon, with the aforesaid pulverized iron-ore, iron-sand, wrought-iron, iron shavings, scraps, chips, and sponge, in a reverberatory furnace, as follows:

The ore should be pure, and as free as possible from earthy matters, finely pulverized, when other ore than the sand ore is used, and the ore so prepared or the iron-sand ore, wrought-iron, or iron scraps, shavings, chips, or sponge aforesaid, should be mixed with the pulverized plumbago or charcoal, or the other carbons.

The proportion of the plumbago or charcoal, or other carbons used, should vary from one to thirty-five per cent. in weight of the ore, according to the nature of the substance to be deoxidized and carburized, and according to the quality of the steel intended to be produced, and according to the purity of the plumbago itself.

Oxide of manganese may be used, as in the ordinary process of cast-steel making, with blister-steel or wrought-iron. This mixture is compressed or not, at will. If plumbago forms part of the mixture, this mixture is then treated in a clay or other non-fusible pot, in the same manner as the melting of blister-steel, or it is treated in a reverberatory furnace, in the manner hereinafter described.

If charcoal is used, the mixture is placed in a reverberatory furnace, constructed so as to allow the metal to be drawn after fusion. It is then covered with a flux of glass or blast-furnace cinders, or with glass-making materials, or with thin slabs of soapstone or steatite, or with those substances combined, and then heated until reduction and fusion take place, the metal being protected against oxidation by the aforesaid covering.

I prefer to use plumbago in the process described under my first head, but anthracite being similar in composition, and in some of its physical characteristics, may be substituted wholly or in part for plumbago.

I do not claim as my invention the use of powdered charcoal as a reducing and carburizing-agent in principle; but

What I claim as peculiarly my invention, is—

1. The use of the admixture of plumbago and iron-ores, iron-sand, wrought-iron, iron scraps, shavings, chips, and sponge, in a clay crucible or other non-melting pot, substantially as set forth, to produce cast-steel at one operation.

2. The use of the said admixture of plumbago and iron-ores, iron-sand, wrought-iron, iron scraps, shavings, chips, and sponge, in a reverberatory furnace, the said mixture covered with a flux of glass or blast-furnace cinders, or with glass-making materials, or with thin slabs of soapstone, or with those substances combined during reduction, carburization, and fusion, to produce cast-steel at one operation.

3. The use of the admixture of powdered charcoal, compressed or not with iron-ores, iron-sand, wrought-iron, iron scraps, shavings, chips, and sponge, in a reverberatory furnace, the said mixture covered with a flux of glass, or glass-making materials, or blast-furnace cinders, or thin slabs of soapstone, or with those substances combined, to make cast-steel at one operation.

Montreal, August 31, 1869.

LOUIS LA BRECHE-VIGER.

Witnesses:
L. LAFLAMME,
A. LAFERRIÈRE.